(12) United States Patent
Chadwick et al.

(10) Patent No.: US 9,339,045 B2
(45) Date of Patent: May 17, 2016

(54) CONTROL OF ATMOSPHERE WITHIN A CLOSED ENVIRONMENT

(75) Inventors: William C. Chadwick, Syracuse, NY (US); Eric W. Adams, Manlius, NY (US); Catherine Thibaud-Erkey, South Windsor, CT (US)

(73) Assignee: CARRIER CORPORATION, Farmington, CT (US)

( * ) Notice: Subject to any disclaimer, the term of this patent is extended or adjusted under 35 U.S.C. 154(b) by 65 days.

(21) Appl. No.: 14/232,984

(22) PCT Filed: Jul. 11, 2012

(86) PCT No.: PCT/US2012/046142
§ 371 (c)(1),
(2), (4) Date: Jan. 15, 2014

(87) PCT Pub. No.: WO2013/012623
PCT Pub. Date: Jan. 24, 2013

(65) Prior Publication Data
US 2014/0202183 A1 Jul. 24, 2014

Related U.S. Application Data

(60) Provisional application No. 61/508,863, filed on Jul. 18, 2011.

(51) Int. Cl.
*B01D 53/02* (2006.01)
*A23B 7/148* (2006.01)
(Continued)

(52) U.S. Cl.
CPC .............. *A23B 7/148* (2013.01); *A23L 3/3418* (2013.01); *A23L 3/3427* (2013.01); *B01D 53/0431* (2013.01)

(58) Field of Classification Search
CPC .... A23B 7/148; A23L 3/3418; A23L 3/3427; B01D 53/0431
See application file for complete search history.

(56) References Cited

U.S. PATENT DOCUMENTS 3,795,749 A   3/1974   Cummin et al.
3,798,333 A   3/1974   Cummin et al.
(Continued)

FOREIGN PATENT DOCUMENTS

EP   0467668 A1   1/1992
EP   0565827 A1   10/1993
(Continued)

OTHER PUBLICATIONS

Search Report from Singapore, for application SG 2014002984, dated Mar. 10, 2015, 8 pages.
(Continued)

*Primary Examiner* — Christopher P Jones
(74) *Attorney, Agent, or Firm* — Cantor Colburn LLP

(57) ABSTRACT

A method and apparatus are disclosed for controlling a concentration of carbon dioxide in a gaseous atmosphere within a closed environment of a refrigerated transport container to maintain the concentration of carbon dioxide therein at a desired level. A carbon dioxide scrubber apparatus operates alternately in an adsorption mode and a regeneration mode. When a perishable produce is stowed in the closed environment, for example in a cargo box of a refrigerated transport container, the concentration of carbon dioxide may be maintain at a desired level to retard ripening of the perishable produce.

10 Claims, 6 Drawing Sheets

(51) Int. Cl.
 *A23L 3/3418* (2006.01)
 *A23L 3/3427* (2006.01)
 *B01D 53/04* (2006.01)

(56) References Cited

U.S. PATENT DOCUMENTS

| | | | |
|---|---|---|---|
| 4,303,009 | A | 12/1981 | La Monica |
| 4,740,378 | A | 4/1988 | Jameson |
| 4,882,058 | A | 11/1989 | Burton |
| 4,961,322 | A | 10/1990 | Oguma et al. |
| 5,240,611 | A | 8/1993 | Burton |
| 5,269,155 | A | 12/1993 | Adelmann |
| 5,419,688 | A | 5/1995 | Basinski et al. |
| 5,438,841 | A | 8/1995 | Cahill-O'Brien et al. |
| 5,451,248 | A | 9/1995 | Sadkowski et al. |
| 5,457,963 | A | 10/1995 | Cahill-O'Brien et al. |
| 5,507,539 | A | 4/1996 | Basinski |
| 5,515,693 | A | 5/1996 | Cahill-O'Brien et al. |
| 5,515,769 | A | 5/1996 | Basinski et al. |
| 5,520,720 | A | 5/1996 | Lemcoff |
| 5,795,370 | A | 8/1998 | Garrett et al. |
| 5,807,423 | A | 9/1998 | Lemcoff et al. |
| 5,814,130 | A | 9/1998 | Lemcoff et al. |
| 5,876,488 | A | 3/1999 | Birbara et al. |
| 6,013,293 | A | 1/2000 | De Moor |
| 6,199,397 | B1 | 3/2001 | Khelifa et al. |
| 6,364,938 | B1 | 4/2002 | Birbara et al. |
| 6,460,352 | B1 | 10/2002 | Lemcoff et al. |
| 6,755,892 | B2 | 6/2004 | Nalette et al. |
| 6,770,120 | B2 * | 8/2004 | Neu et al. ................ 95/96 |
| 7,089,933 | B2 | 8/2006 | Goldblatt et al. |
| 7,665,314 | B2 | 2/2010 | Senf, Jr. et al. |
| 7,736,416 | B2 | 6/2010 | Nalette et al. |
| 7,740,810 | B2 | 6/2010 | Hay et al. |
| 2009/0025555 | A1 * | 1/2009 | Lively et al. ............... 95/114 |
| 2010/0199649 | A1 | 8/2010 | Roberts et al. |
| 2010/0218748 | A1 | 9/2010 | Arnalsteen et al. |
| 2010/0224069 | A1 | 9/2010 | Donadei et al. |
| 2010/0313763 | A1 | 12/2010 | Lang et al. |
| 2011/0017664 | A1 | 1/2011 | Conner et al. |
| 2011/0042236 | A1 | 2/2011 | Kim et al. |

FOREIGN PATENT DOCUMENTS

| | | |
|---|---|---|
| EP | 1093726 A1 | 4/2001 |
| FR | 2523472 A3 | 9/1983 |
| GB | 2476638 A | 7/2011 |
| JP | S56169544 A | 12/1981 |
| WO | 9505753 A1 | 3/1995 |
| WO | 9831235 A1 | 7/1998 |
| WO | 2004107868 A1 | 12/2004 |
| WO | 2007033668 A1 | 3/2007 |
| WO | 2008017307 A1 | 2/2008 |

OTHER PUBLICATIONS

International Preliminary Report on Patentability and Written Opinion for International Application Serial No. PCT/US2012/046142. International filed Jul. 11, 2012. Date of Issuance Jan. 21, 2014.
International Search Report of the International Searching Authority for Application No. PCT/US2012/046142; Date of Mailing Oct. 24, 2012.

* cited by examiner

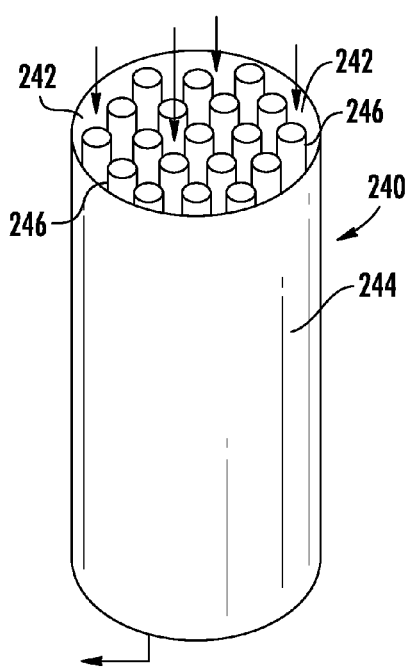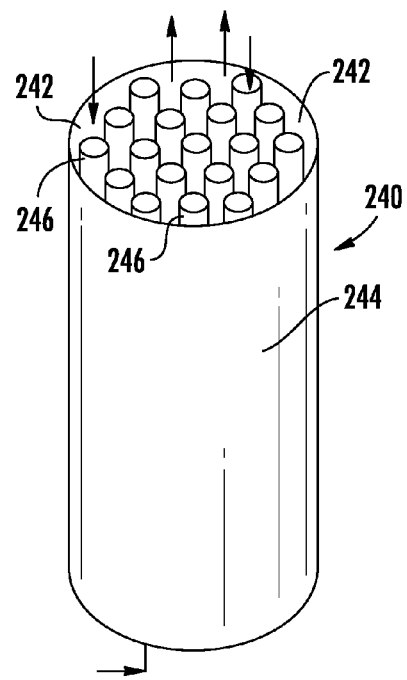
FIG. 5A   FIG. 5B
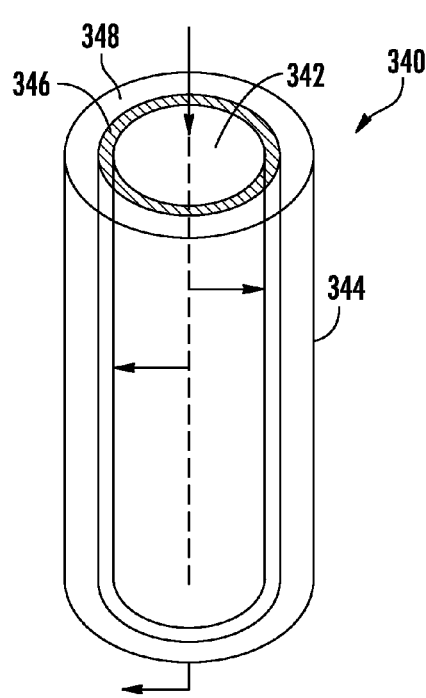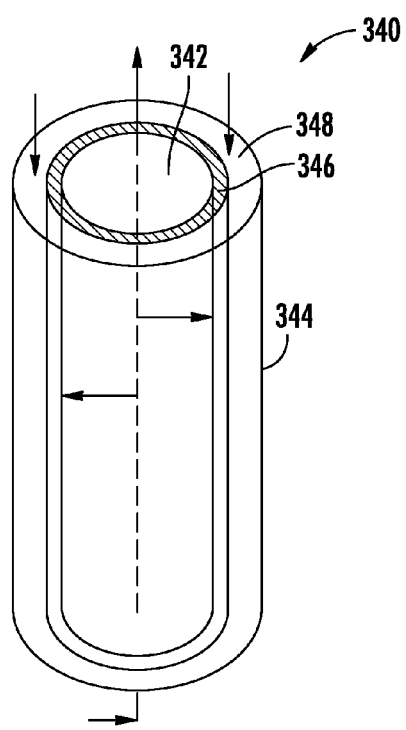
FIG. 6A   FIG. 6B

250# CONTROL OF ATMOSPHERE WITHIN A CLOSED ENVIRONMENT

CROSS-REFERENCE TO RELATED APPLICATION

Reference is made to and this application claims priority from and the benefit of U.S. Provisional Application Ser. No. 61/508,863, filed Jul. 18, 2011, and entitled CONTROL OF ATMOSPHERE WITHIN A CLOSED ENVIRONMENT, which application is incorporated herein in its entirety by reference.

BACKGROUND OF THE INVENTION

This invention relates generally to controlling the composition of the atmosphere within a closed environment and, more particularly to the removal of carbon dioxide, and optionally other byproduct of gases from the respiration of fresh produce, from an atmosphere within a closed environment, such as the cargo box of a refrigerated transport container.

Perishable goods are commonly transported in a controlled environment within an enclosed space such as a cargo box of a truck, trailer, sea container, or intermodal container. A refrigeration system, also known as a transport refrigeration system, is used in operative association with the enclosed space within the cargo box for controlling the temperature of the air within the enclosed space. The refrigeration system is operative to maintain the air temperature within the enclosed space within a desired temperature range selected for the particular type of perishable goods stowed within the cargo box. The refrigeration system includes a refrigeration unit including a refrigerant compressor and condenser disposed externally of the cargo box and an evaporator disposed in operative association with the enclosed space of the cargo box. The compressor, condenser and evaporator are connected in a refrigerant circuit in series refrigerant flow relationship in a refrigeration cycle. When the refrigeration system is operating, air is drawn from within the enclosed space by a fan or fans associated with the evaporator, passed through an evaporator disposed in operative association with the enclosed space in heat exchange relationship with the refrigerant circulating through the refrigerant circuit to be cooled, and cooled air is then supplied back to the enclosed space.

Certain perishable produce, such as fresh fruits, vegetables and flowers, produce carbon dioxide as a product of the respiration process. In a closed environment, due to post harvest respiration, the carbon dioxide concentration rises and the oxygen concentration drops in the atmosphere within the closed environment. If the oxygen concentration gets too low or the carbon dioxide concentration gets too high, the produce can spoil. Additionally, certain fruits, vegetables and flowers release ethylene and/or ethylene compounds as a byproduct of the ripening process. The presence of ethylene-based gases within the enclosed space of the cargo box is known to promote the ripening process.

To alleviate these conditions, it is known to introduce ambient air into the closed environment within the cargo box, while simultaneously venting air from within the closed environment in the cargo box. Various air exchange systems are available for use in connection with the transport of perishable cargo. For example, U.S. Pat. No. 6,763,677 discloses a manually operated fresh air vent associated with a refrigerated transport container for providing fresh air to the circulating air and exhausting a portion of the circulating air exteriorly of the cargo box of the container.

It is also known in the art to delay ripening of a perishable produce in transit within a container or other enclosed cargo storage space by providing a controlled atmosphere within the enclosed cargo storage space. Typically, a high nitrogen, low oxygen atmosphere is provided by either replacing the atmospheric air within the enclosed cargo storage space with nitrogen gas prior to shipment or displacing the atmospheric air with nitrogen generated by an onboard system that extracts nitrogen from the ambient air. The former approach may be suitable for well sealed containers over a short haul, but inadequate for long haul transport of perishable produce. The latter approach is generally considered more suitable for longer haul transport of perishable produce, but requires higher capital costs, as well as higher operating costs.

It is also known to remove carbon dioxide produced by respiration during transit from the atmosphere within an enclosed cargo storage space by passing the gas within the cargo storage space through a bed of carbon dioxide adsorbent associated with the cargo storage space to scrub carbon dioxide from the gas passing through the adsorbent bed. However, conventional systems of this type are non-regenerative and lose scrubbing efficiency as the adsorbent bed becomes saturated. Therefore, such non-regenerative systems have limited application, particularly in the long haul transport of perishable produce.

SUMMARY OF THE INVENTION

A method is provided for controlling a concentration of carbon dioxide in a gaseous atmosphere within a closed environment to maintain the concentration of carbon dioxide in the gaseous atmosphere within the closed environment at a desired level.

A carbon dioxide scrubber apparatus operable alternately in an adsorption mode and a regeneration mode is also provided.

The method for controlling a concentration of carbon dioxide in an atmosphere within a closed environment includes the steps of: providing a porous mass of a regenerative carbon dioxide adsorbent material; circulating a flow of air from within the closed environment through the carbon dioxide adsorbent material to remove at least a portion of carbon dioxide in said flow of air and then directing the air back into the closed environment; regenerating the porous mass of carbon dioxide adsorbent by removing adsorbed carbon dioxide from the porous mass of carbon dioxide adsorbent; and selectively repeating the aforesaid second and third steps to maintain the concentration of carbon dioxide in the gaseous atmosphere within the closed environment at a desired level or within a desired range. The concentration of carbon dioxide within the closed environment may be maintained at a desired level to retard ripening of a perishable produce stowed therein. The concentration of carbon dioxide within the closed environment may be maintained at a concentration of less than 5 percent by volume. In an embodiment, the regenerative carbon dioxide adsorbent material may comprise activated carbon. In another embodiment, the regenerative carbon dioxide adsorbent material may comprise zeolite. In another embodiment, the regenerative carbon dioxide adsorbent material may comprise metal organic frameworks. The regenerative carbon dioxide adsorbent material may include both a carbon dioxide adsorbent and an ethylene adsorbent.

The method may further include terminating the flow of air from the closed environment through the carbon dioxide adsorbent material after a predetermined time from the initiation of the flow of air from the closed environment through the carbon dioxide adsorbent material. The method may further include the step of sensing a concentration of carbon dioxide in the circulating flow of gas from the closed environment and terminating the flow of gas from the closed environment through the carbon dioxide adsorbent material in response to the sensed concentration of carbon dioxide in the circulating flow of gas from the closed environment. The concentration of carbon dioxide in the circulating flow of gas from the closed environment may be sensed at a location that is either upstream or downstream of the porous mass of carbon dioxide adsorbent material.

The step of regenerating the porous mass of regenerative carbon dioxide adsorbent by removing adsorbed carbon dioxide from the porous mass of carbon dioxide adsorbent may include passing a flow of ambient air from outside the closed environment through the carbon dioxide adsorbent material to remove at least a portion of the absorbed carbon dioxide from the carbon dioxide adsorbent material, and terminating the flow of ambient air through the carbon dioxide adsorbent material prior to reestablishing the circulating flow of air from the closed environment through the porous mass of carbon dioxide adsorbent material.

The method may further include the step of preheating the flow of ambient air for regeneration of the carbon dioxide adsorbent material prior to passing the flow of ambient air through the carbon dioxide adsorbent material. The step of preheating the flow of ambient air may include passing a flow of ambient air in heat exchange relationship with a refrigerant in a refrigerant heat rejection heat exchanger. The step of preheating the flow of ambient air may alternatively include passing a flow of ambient air in heat exchange relationship with a flow of exhaust gases from a fuel-fired engine.

In an embodiment, the step of regenerating the porous mass of carbon dioxide adsorbent by removing adsorbed carbon dioxide from the porous mass of carbon dioxide adsorbent may include heating the porous mass of carbon dioxide adsorbent. In another embodiment, the step of regenerating the porous mass of carbon dioxide adsorbent by removing adsorbed carbon dioxide from the porous mass of carbon dioxide adsorbent may include establishing a vacuum across the porous mass of carbon dioxide adsorbent to draw absorbed carbon dioxide from the porous mass of carbon dioxide adsorbent.

In an embodiment of the method, the step of providing a porous mass of a regenerative carbon dioxide adsorbent material includes providing a first porous mass of a regenerative carbon dioxide adsorbent material and a second porous mass of a regenerative carbon dioxide adsorbent material, the first porous mass of a regenerative carbon dioxide adsorbent material and the second porous mass of a regenerative carbon dioxide adsorbent material operatively disposed in parallel relationship. In this embodiment, the method may include the further step of operating one of the first and second porous masses of a regenerative carbon dioxide adsorbent material in an adsorption mode and simultaneously operating the other one of the first and second porous masses of a regenerative carbon dioxide adsorbent material in a regeneration mode. The method may also include the further step of switching operation of each of the first and second porous masses of a regenerative carbon dioxide adsorption material in coordination between the adsorption mode and the regeneration mode, such as periodic time elapsed intervals or a sensed concentration of carbon dioxide in the circulating flow of gas from the closed environment.

The regenerative scrubber system for removing carbon dioxide from a closed environment housing a perishable produce includes at least one scrubber apparatus housing a porous mass of a carbon dioxide adsorbent material and defining a flow path through the scrubber apparatus traversing the porous mass of a carbon dioxide adsorbent material, and a controller configured for selectively directing a flow of air from within the closed environment through the flow path during operation in an adsorption mode, and selectively directing a flow of air from outside the closed environment through the flow path during operation in a regeneration mode. The controller may also be configured for switching operation of the scrubber apparatus between the adsorption mode and the regeneration mode. In an embodiment, the controller is configured for switching operation of the at least one scrubber apparatus between the adsorption mode and the regeneration mode at periodic time intervals. In an embodiment, the controller is configured for switching operation of the at least one scrubber apparatus between the adsorption mode and the regeneration mode in response to a sensed concentration of carbon dioxide in the closed environment.

In an embodiment, the regenerative scrubber system includes a first scrubber apparatus and a second scrubber apparatus operatively disposed in parallel relationship, the first scrubber apparatus housing a first porous mass of a carbon dioxide adsorbent material and the second scrubber apparatus housing a second porous mass of a carbon dioxide adsorbent material. In this embodiment, the controller is configured to operate one of the first and second porous masses of a regenerative carbon dioxide adsorbent material in an adsorption mode and simultaneously operate the other one of the first and second porous masses of a regenerative carbon dioxide adsorbent material in a regeneration mode. The controller may be configured to switch operation of the first scrubber apparatus and the second scrubber apparatus between the adsorption mode and the regeneration mode at periodic time intervals. The controller may be configured to switch operation of the first scrubber apparatus and the second scrubber apparatus between the adsorption mode and the regeneration mode in response to a sensed concentration of carbon dioxide in the circulating flow of gas from the closed environment.

In an embodiment, the scrubber apparatus comprises a canister including an outer shell, an inner shell and an intermediate shell disposed in radially spaced relationship about a central axis of the canister. The porous mass of regenerative carbon dioxide adsorbent is disposed in the annular space between the inner shell and the intermediate shell. The inner shell defines a hollow inner core. An annular outer flow passage is defined between the intermediate shell and the outer shell. A plurality of flow openings are formed in each of intermediate and inner shells thereby establishing flow communication between the inner core and the annular outer flow passage through the porous mass of regenerative carbon dioxide adsorbent material.

In an embodiment, the scrubber apparatus comprises an outer shell defining a core and a plurality of tubes disposed coaxially and arrayed in spaced parallel arrangement within the core. The porous mass of regenerative carbon dioxide adsorbent is disposed in the core in the space between the array of tubes and the outer shell. Each tube provides a flow passage through the porous mass of regenerative carbon dioxide absorbent material, through which a heated gas may be passed in a regeneration mode to heat the carbon dioxide adsorbent material.

In an embodiment, the scrubber apparatus comprises an outer shell circumscribing and disposed in radially spaced relationship to and coaxially about an inner shell, thereby defining an annular outer flow passage about the inner core.

The porous mass of regenerative carbon dioxide adsorbent is disposed within an inner core defined within the inner shell. The annular flow passage formed between the inner shell and the outer shell provides a flow passage through which a heated gas may be passed in a regeneration mode to heat the porous mass of regenerative carbon dioxide adsorbent material disposed in the inner core.

In an embodiment, the scrubber apparatus comprises a canister including an outer shell, an inner shell and an intermediate shell disposed in radially spaced relationship about a central axis of the canister. The annular space between the inner shell and the intermediate shell comprise a open metal or carbon foam to enhance the thermal conductivity through the porous mass of regenerative carbon dioxide adsorbent material.

In an embodiment, the scrubber apparatus comprises an outer shell defining a core and a carbon monolith or carbon fiber material is placed within the core or within the annular space.

BRIEF DESCRIPTION OF THE DRAWINGS

For a further understanding of the disclosure, reference will be made to the following detailed description which is to be read in connection with the accompanying drawing, wherein:

FIG. 5a is a sectioned elevation view of another embodiment of a gas adsorption apparatus operating in an adsorption mode;

FIG. 5b is a sectioned elevation view of the gas adsorption of FIG. 5a operating in a regenerative mode;

FIG. 6a is a sectioned elevation view of another embodiment of a gas adsorption apparatus operating in an adsorption mode;

FIG. 6b is a sectioned elevation view of the gas adsorption of FIG. 5b operating in a regenerative mode;

DETAILED DESCRIPTION OF THE INVENTION

Figure 1:
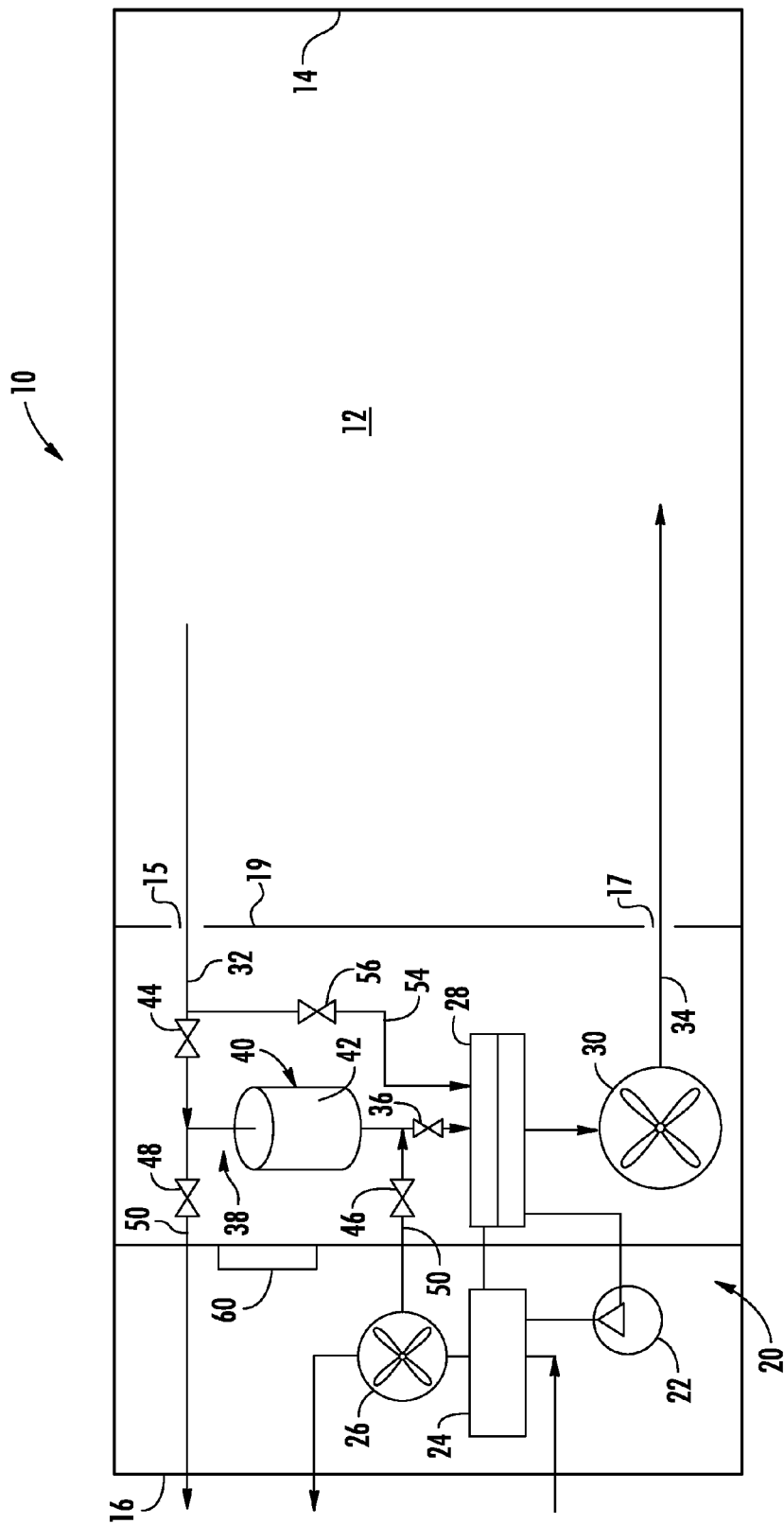
FIG. 1 is a schematic representation of an exemplary embodiment of a refrigerated transport container equipped with a cargo box air scrubber system.

Referring initially to FIG. 1 of the drawing, there is depicted schematically an exemplary embodiment of a refrigerated cargo container, generally referenced 10, equipped with an atmosphere control system. The container 10 defines a closed environment that serves as a cargo space 12, referred to herein as the cargo box, wherein bins, cartons or pallets of cargo (not shown) such as, for example, but not limited to fresh produce, are stacked for transport. The rear wall 14 is provided with one or more doors (not shown) through which access to the cargo box may be had for loading the cargo into the container 10. When the doors are closed, a substantially air-tight, sealed environment is established within the container 10 which, to a substantial extent, prevents air within the container from escaping and prevents air outside the container from penetrating into the cargo box 12.

A refrigeration unit 20 is mounted to a wall of the container 10, typically being received in an opening in the forward wall 16 of the container 10 for conditioning the air within the refrigerated closed environment of the cargo box 12. The refrigeration unit 20 includes a compressor 22 and a condenser/gas cooler module isolated from the cargo box 12 by a partition wall 18, and an evaporator module in air flow communication with the cargo box 12 through a return air opening 15 and a supply air opening 17 in a back panel 19 of the transport refrigeration unit 20 that also forms a front wall of the cargo box 12.

The condenser/gas cooler module includes a condenser/gas cooler heat exchanger 24, which functions as a refrigerant heat rejection heat exchanger, mounted in the forward section of the refrigeration unit 20 external to the cargo box 12 and positioned in association with one or more condenser fans 26 for drawing ambient air, typically through an opening at the lower front of the refrigeration unit 20, passing that air through the condenser/gas cooler heat exchanger 24, and discharging the air back into the ambient environment. The evaporator module includes an evaporator heat exchanger 28, which functions as a refrigerant heat absorption heat exchanger, and one or more evaporator fans 30 that draw return air from the cargo box 12 through a return air duct 32 to pass through the evaporator heat exchanger 28 and thereafter be supplied back into the cargo box 12 of the container 10 through supply air duct 34. The compressor 22, the condenser/gas cooler heat exchanger 24 and the evaporator heat exchanger 28 are disposed in a conventional manner in a refrigerant circuit in a conventional refrigeration cycle arrangement whereby the circulating air is cooled when passing through the evaporator heat exchanger 28 in heat exchange relationship with the refrigerant.

Although the closed environment of the cargo box 12 is substantially air-tight, when freshly harvested produce, such as fruits, vegetables and flowers, are stowed in the cargo box 12, the composition of the atmosphere within the closed environment will change due to respiration by the produce. More specifically, the concentration of carbon dioxide will rise and the concentration of oxygen will fall as the produce ripens. Additionally, ethylene will be produced as a product of the respiration of fresh produce. As ethylene promotes ripening, the increase of ethylene is undesirable, particularly for long haul transmit. Thus, the term "box air" as used herein refers to the atmosphere within the closed environment of the cargo box 12 irrespective of the composition of the atmosphere.

In accord with the method disclosed herein, a porous mass of a regenerative carbon dioxide adsorbent is provided onboard the container 10 through which box air from the closed environment within the cargo box 12 may be circulated for removing at least a portion of the carbon dioxide present in the box air flowing through the porous mass of carbon dioxide absorbent. The carbon dioxide adsorbent may itself comprise a material that will also adsorb ethylene or may be mixed with an adsorbent that is specific for adsorbing ethylene. It is to be understood that the term "regenerative" means that the efficiency of removal of carbon dioxide, or carbon dioxide and ethylene, can be maintained by desorbing adsorbed carbon dioxide from the adsorbent material. Due to this regenerative characteristic, the carbon dioxide adsorbent is suitable for use in accordance with the method disclosed herein over the time span of several days or even weeks during the long haul transport of fresh produce. In an embodiment, the porous regenerative carbon dioxide adsorbent consists essentially of activated carbon. In an embodiment, the porous regenerative carbon dioxide adsorbent consists essentially of zeolite. In an embodiment, the porous regenerative carbon dioxide adsorbent comprises a mixture of activated carbon and at least one other active adsorbent material, such as, for example, but not limited to zeolite. In an embodiment, the porous regenerative carbon dioxide adsorbent includes a metal organic framework. The carbon dioxide adsorbent material may be, for example, in the form of particles, granules, pellets, extruded pellets in a loose packed bed, or as fibers or as a monolithic member, or as a coating on a support framework.

Figure 2:
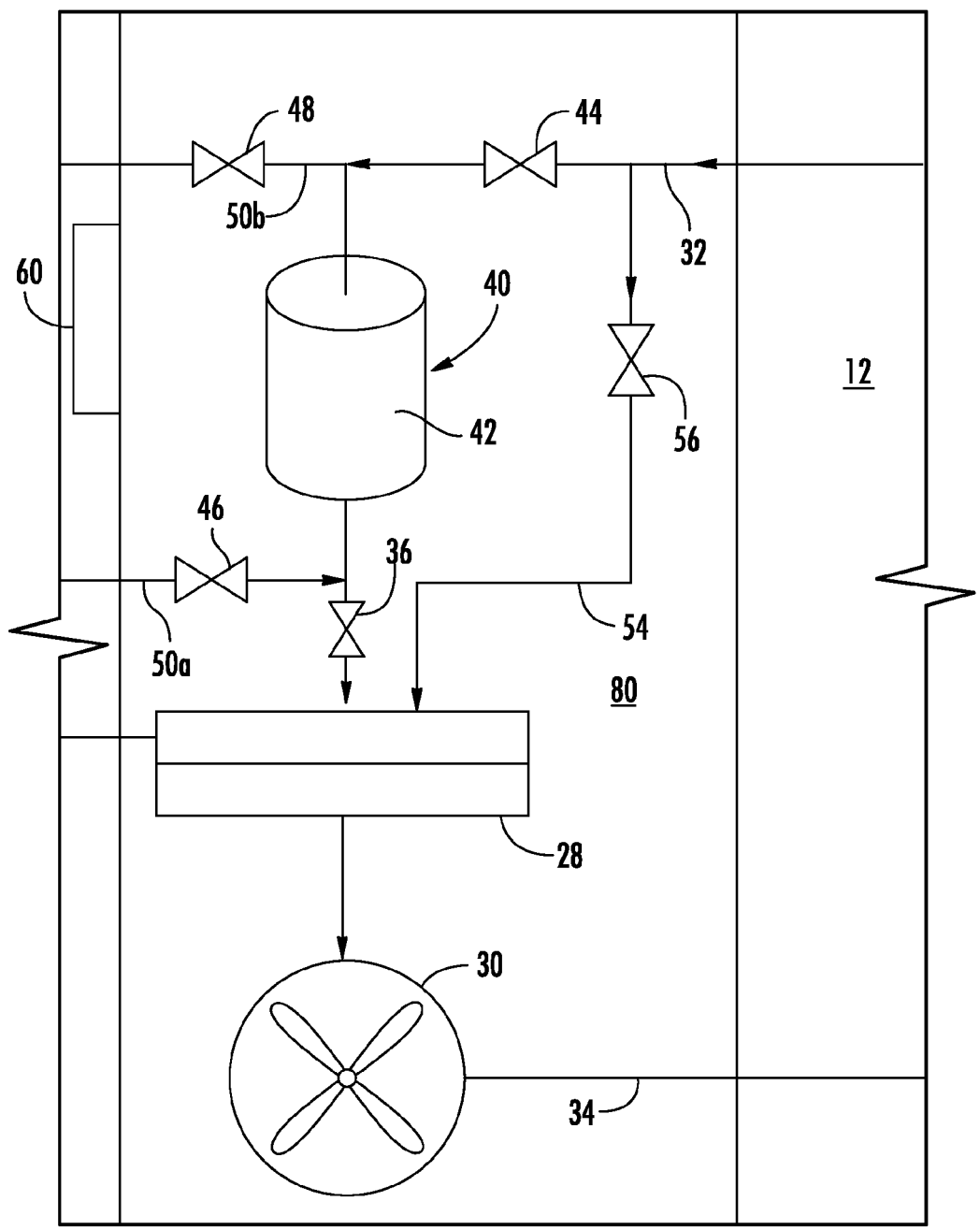
FIG. 2 is a schematic representation of an exemplary embodiment of the box air scrubber system as disclosed herein.

Referring to FIGS. 1 and 2, there is depicted an exemplary embodiment of a regenerative scrubber system 38 for removing carbon dioxide from an atmosphere within a closed environment, in particular the box air within the cargo box 12 of a refrigerated transport container 10 housing perishable produce. In the depicted embodiment, the regenerative scrubber system 38 includes a single scrubber apparatus 40 housing a porous mass of regenerative carbon dioxide adsorbent 42 disposed onboard the refrigerated transport container 10 disposed in the evaporator compartment 80 in association with the evaporator module of the transport refrigeration unit. The porous mass of regenerative carbon dioxide adsorbent 42 is disposed upstream of the evaporator fan 30 in the flow path of circulating box air. When the evaporator fan 30 is operating, box air is drawn from the cargo box 12 through the return air duct 34, passes through the porous regenerative carbon dioxide adsorption material 42 and thence through the evaporator heat exchanger 28 and back to the cargo box 12 through the supply air duct 34. An isolation damper 36 may be disposed between the box air scrubber system 40 and the evaporator heat exchanger 28.

When the scrubber system 38 is operated in the regenerative mode, air from outside the cargo box 12 is passed through a regeneration air duct 50a and the scrubber apparatus 40. The regeneration air traverses the porous mass of regenerative carbon dioxide adsorption material 42 and in doing so collects adsorbed carbon dioxide from the carbon dioxide adsorption material 42. Having traversed the porous mass of regenerative carbon dioxide adsorption material 42, the regeneration air, now laden with carbon dioxide, is exhausted outside through the downstream leg 50b of the regeneration air duct 50. The fan or fans 26 associated with the refrigerant heat rejection heat exchanger 24 may be used to convey the regeneration air through the regeneration air duct 50. In the embodiment depicted in FIG. 1, the regeneration air constitutes air drawn through the refrigerant heat rejection heat exchanger 24 by the fan or fans 26. Alternatively, a separate dedicated fan (not shown) may be provided for conveying the regeneration air through the regeneration air duct 50. Additionally, the regeneration air may be ambient temperature air or ambient air having been preheated by passing in heat exchange relationship with a heating fluid, such as, for example, but not limited to refrigerant or even engine exhaust gas if a fossil fuel engine is carried on board the container 10 for powering the refrigerant unit or even engine exhaust gas from an engine powering a truck or trailer cab associated with the container 10.

The box air scrubber system 38 may further include a controller 60 and a plurality of flow control devices 44, 46 and 48, for example flow control dampers, in control communication with and selectively positionable by the controller 60. The first flow control damper 44 is operatively disposed in the return air duct 32 upstream of the porous bed of regenerative carbon dioxide absorbent 42. The second flow control damper 46 is operatively disposed in the upstream leg 50a of regeneration air duct 50 and the third flow control damper 48 is operatively disposed in the downstream leg 50b of the regeneration air duct 50. For operation of the regenerative scrubber system 38 in an adsorption mode for removing carbon dioxide from the circulating box air, the isolation damper 36 and the first flow control damper 44 are positioned open and both the second flow control damper 46 and the third flow control damper 48 are positioned closed. For operation of the regenerative scrubber system 38 in a regeneration mode for desorbing adsorbed carbon dioxide from the porous bed of regenerative carbon dioxide adsorbent 42, the isolation damper 36 and the first flow control damper 44 are both positioned closed and the both the second flow control damper 46 and the third flow control damper 48 are both positioned open.

Additionally, a scrubber system bypass 54 may be provided through which box air drawn by the evaporator fan 30 from the cargo box 12 through the return air duct 34 may pass directly to and through the evaporator heat exchanger 28, bypassing the box air scrubber system 38. A bypass flow control device 56, for example a flow control damper, may be operatively disposed in the scrubber system bypass 54 for controlling the amount of air flow through the scrubber system bypass 54. When the box air scrubber system 38 is operating in the adsorption mode, the bypass flow control damper 56 may be positioned fully closed or partially open. In the fully closed positioned, the bypass flow control damper 56 substantially blocks box air flowing through the return air duct 34 from passing through the scrubber system bypass 54, whereby substantially all of the circulating box air flow will pass through the box air scrubber system 38. When the bypass flow control damper 56 is positioned in a partially open position, a first portion of the circulating box air flowing through the return air duct passes through the box air scrubber system 38, while the remainder of the circulating box air passes through the scrubber system bypass 54. When the box air scrubber system 38 is operating in the regeneration mode and the refrigeration unit is in operation, or when the scrubber system 38 is out of service, the bypass flow control damper 56 is positioned fully open to allow all of the circulating box air to flow from the return air duct 34 through the scrubber system bypass 54.

Figure 3:
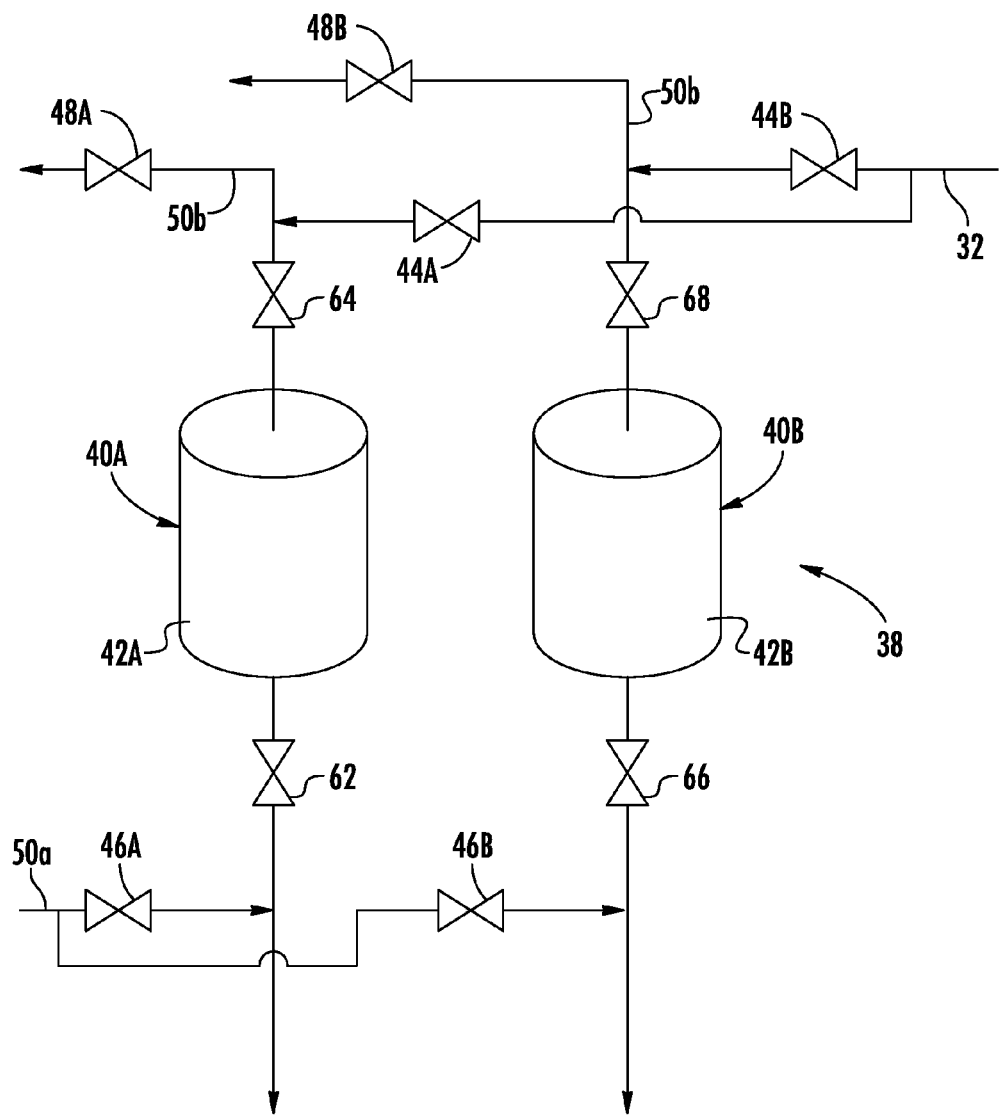
FIG. 3 is a schematic representation of another exemplary embodiment of the box air scrubber system as disclosed herein.

Referring now to FIG. 3, a second exemplary embodiment of the scrubber system 38 is depicted having multiple scrubber apparatus disposed onboard the refrigerated transport container 10 in association with the evaporator module of the transport refrigeration unit. In the depicted embodiment, the onboard scrubber system 38 includes a first scrubber apparatus 40A and a second scrubber apparatus 40B operatively disposed in parallel relationship upstream of the evaporator fan 30 in the flow path of circulating box air. The first scrubber apparatus 40A houses a first porous mass of a carbon dioxide adsorbent material 42A and the second scrubber apparatus 40B houses a second porous mass of a carbon dioxide adsorbent material 42B. In this embodiment, the controller 60 (not shown in FIG. 3) is configured to operate one of the first and second scrubber apparatus 40A, 40B in an absorption mode and simultaneously operate the other one of the first and second scrubber apparatus 40A, 40B in a regeneration mode. When the evaporator fan 30 (not shown in FIG. 3) is operating, box air is drawn from the cargo box 12 through the return air duct 34, passes through the porous regenerative carbon dioxide adsorption material 42A or 42B associated with the one of the scrubber apparatus 40 A or 40B that is in an adsorption mode and thence through the evaporator heat exchanger 28 and back to the cargo box 12 through the supply air duct 34. With respect to the other of the first and second scrubber apparatus 40A, 40B operating in the regeneration mode, air from outside the cargo box 12 is passed through the upstream leg 50a of the regeneration air duct 50 and the porous regenerative mass of carbon dioxide absorbent to 42A, 42B associated therewith to remove adsorbed carbon dioxide and then exhausted through the downstream leg 50b of the regeneration air duct 50. An isolation damper 36 (not shown in FIG. 3) may be disposed between the box air scrubber system 40 and the evaporator heat exchanger 28.

In this embodiment, the box air scrubber system 40 further includes a plurality of flow control devices 44A, 46A and 48A, for example flow control dampers, associated with the scrubber apparatus 40A and a plurality of flow control devices 44B, 46B and 48B, for example flow control dampers, associated with the scrubber apparatus 40B. The first flow control dampers 44A, 44B are operatively disposed in the return air duct 32 upstream of the scrubber apparatus 40A, 40B, respectively. The second flow control dampers 46A, 46B are operatively disposed in the upstream leg 50a of the regeneration air duct 50 upstream of the scrubber apparatus 40A, 40B, respectively, and the third flow control dampers 48A, 48B are operatively disposed in the downstream leg 50b of the regeneration air duct 50 downstream of the scrubber apparatus 40A, 40B, respectively. Additionally, isolation dampers 62 and 64 may be provided in association with the scrubber apparatus 40A and isolation dampers 66 and 68 may be provided in association with the scrubber apparatus 40B. Each of the aforementioned dampers is in control communication with and selectively positionable by the controller 60.

In the multiple scrubber embodiment of the scrubber system 38, one of the scrubber apparatus 40A, 40B is operated in the carbon dioxide adsorption mode, while the other of the scrubber apparatus 40A, 40B is operated in the regeneration mode. Then after a predetermined time period of operation, the scrubber apparatus that had been operating in the adsorption mode is switched to the regeneration mode, and the scrubber apparatus that had been operating in the regeneration mode is switched to the adsorption mode.

When the scrubber apparatus 40A is operated in an adsorption mode for removing carbon dioxide from the circulating box air, the isolation dampers 62, 64 and the first flow control damper 44A are open and both the second flow control damper 46A and the third flow control damper 48A are closed and the circulating box air passes through the porous mass of regenerative carbon dioxide absorbent 42A. At the same time, the scrubber apparatus 40B is operated in the regeneration mode for removing carbon dioxide from the porous mass of regenerative carbon dioxide adsorbent 42B, isolation dampers 66, 68 and the second and third flow control dampers 46B and 48B are open and the first flow control damper 44B is closed.

When the scrubber apparatus 40B is operated in an adsorption mode for removing carbon dioxide from the circulating box air, the isolation dampers 66, 68 and the first flow control damper 44B are open and both the second flow control damper 46B and the third flow control damper 48B are closed and the circulating box air passes through the porous mass of regenerative carbon dioxide absorbent 42B. At the same time, the scrubber apparatus 40A is operated in the regeneration mode for removing carbon dioxide from the porous mass of regenerative carbon dioxide adsorbent 42A, isolation dampers 62, 64 and the second and third flow control dampers 46A and 48A are open and the first flow control damper 44A is closed.

Figure 4A:
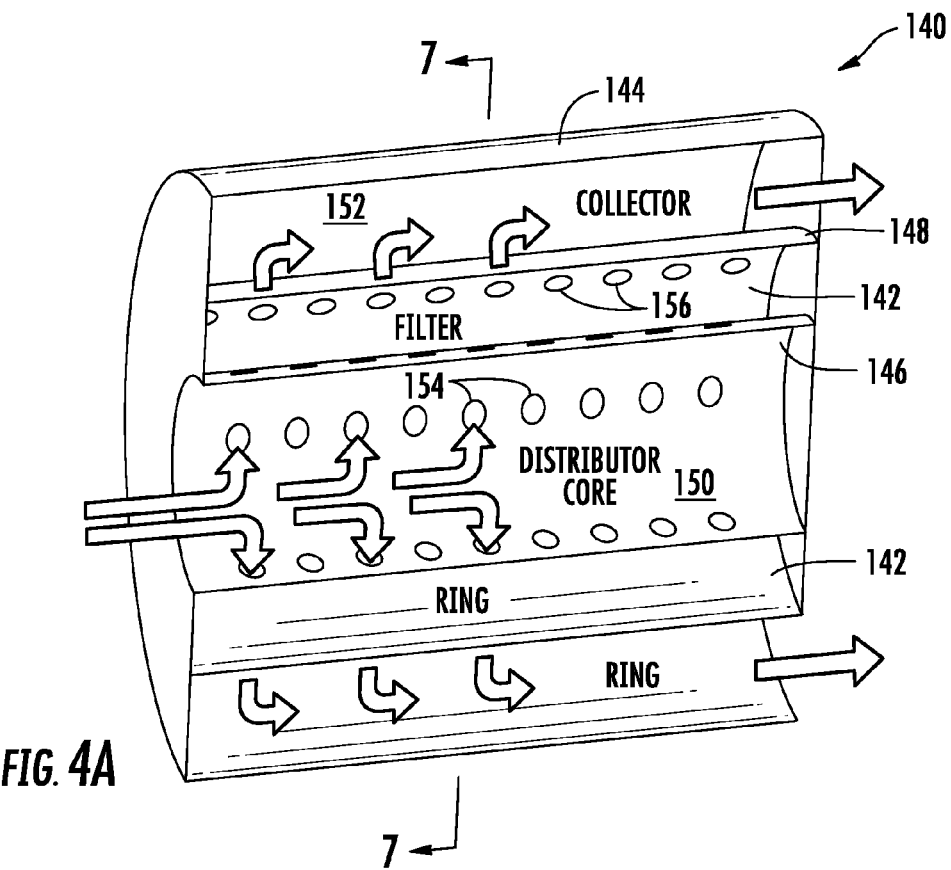
FIG. 4a is a sectioned elevation view, in perspective, of an embodiment of a gas adsorption apparatus operating in an adsorption mode.
Figure 4B:
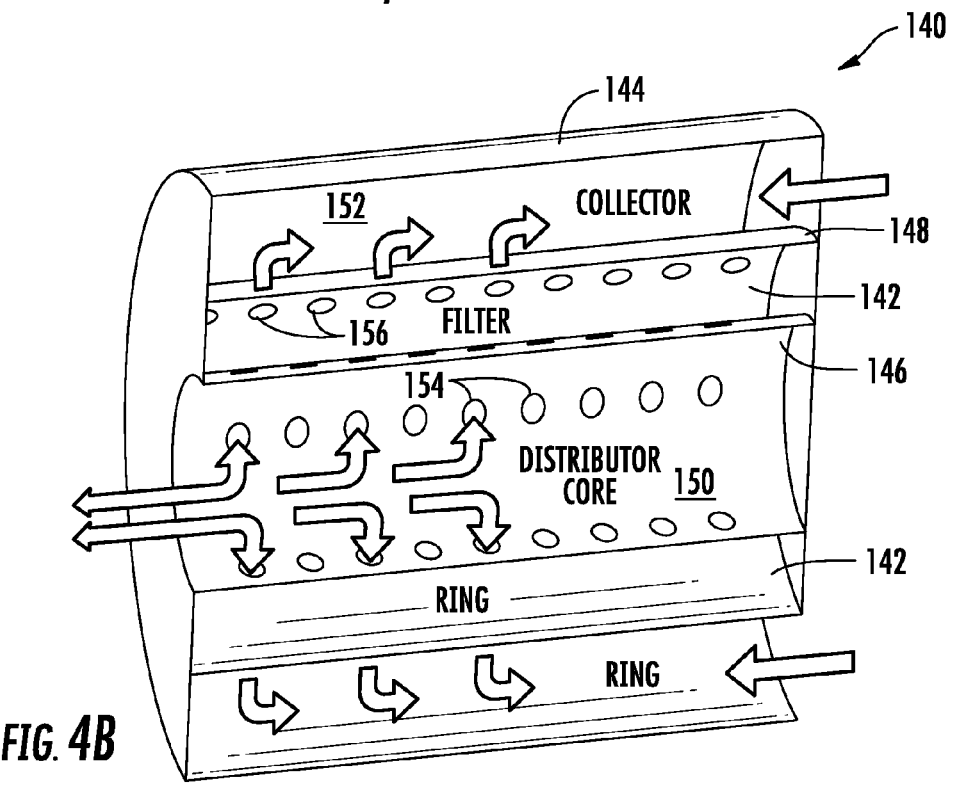
FIG. 4b is a sectioned elevation view, in perspective, of the gas adsorption apparatus of FIG. 4a operating in a regenerative mode.

Various exemplary embodiments of the regenerative scrubber apparatus 40 are depicted in FIGS. 4, 5 and 6, respectively. Referring now to FIGS. 4A and 4B, the scrubber apparatus 140 depicted therein comprises a canister including an outer shell 144 circumscribing both an inner shell 146 and an intermediate shell 148. The three shells 144, 146 and 148 may each be cylindrical shells coaxially disposed about a central axis of the canister. The inner shell 146 defines a hollow inner core 150 that is open at a first end of the canister and closed at a second end of the canister. The intermediate shell 148 is spaced radially outboard of and circumscribes the inner shell 146 thereby forming an annular space which is closed at both the first and second ends of the canister. The outer shell 144 is spaced radially outboard of the intermediate shell 148 to form an annular outer passage 152 that is closed at the first end of the canister and open at the second end of the canister.

Figure 7:
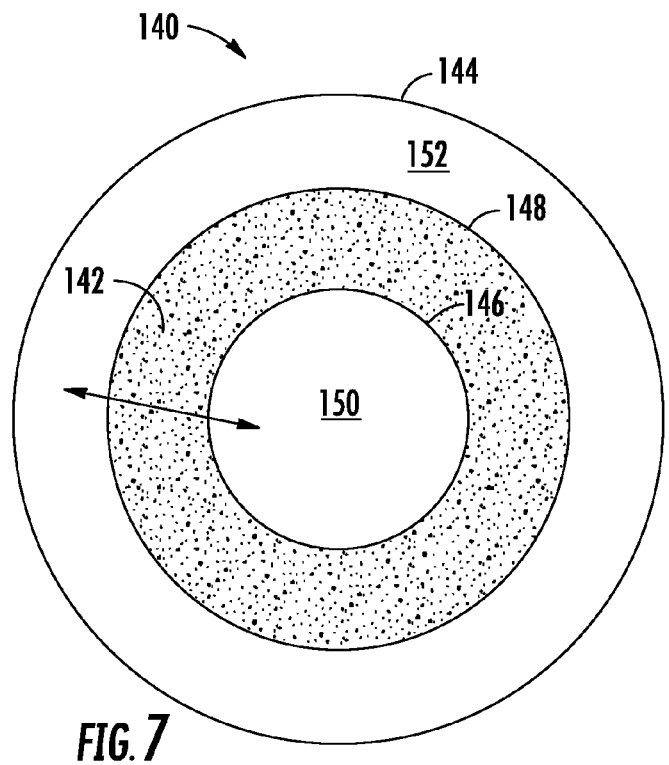
FIG. 7 is a cross-sectional elevation view taken along line 7-7 of FIG. 4.

The porous mass of regenerative carbon dioxide adsorbent 142 is disposed in the annular space between the inner shell 146 and the intermediate shell 148. The inner shell 146 is perforated with a plurality of openings 154 and the intermediate shell 148 is perforated with a plurality of openings 156 such that air may pass through the porous mass of regenerative carbon dioxide adsorbent 142 disposed in the annular space between the inner shell 146 and the intermediate shell 148. In an embodiment, the porous mass of regenerative carbon dioxide adsorbent 142 may comprise a bed of carbon dioxide adsorbent particles packed into the annular space between the inner shell 146 and the intermediate shell 148, for example as depicted in FIG. 7. In an embodiment, an open metal or carbon foam may be disposed within the annular space between the inner shell and the intermediate shell 148 to enhance the thermal conductivity through the porous mass of regenerative carbon dioxide adsorbent material.

Figure 8:
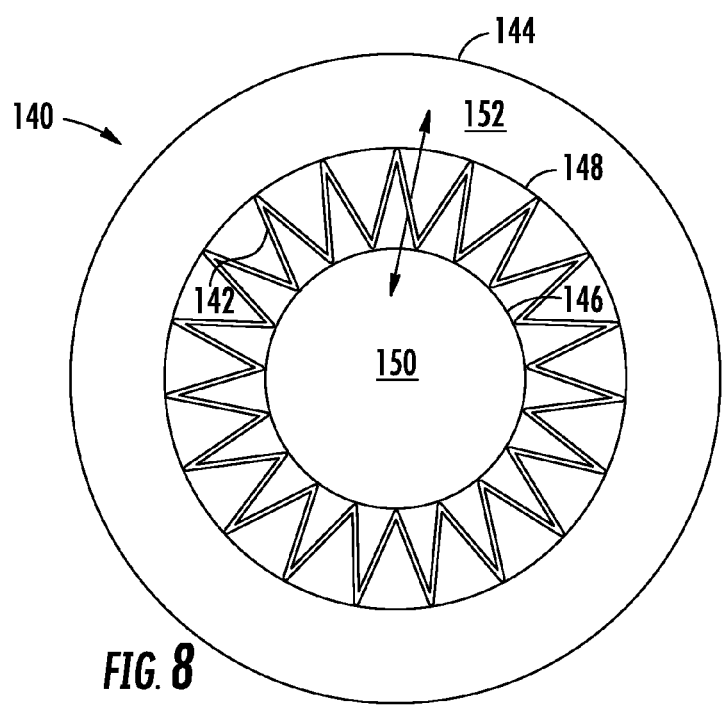
FIG. 8 is a cross-sectional elevation view of an alternate embodiment of the arrangement of the adsorbent material of FIG. 7.

In an embodiment, the porous mass of regenerative carbon dioxide adsorbent 142 may comprise a folded ribbon impregnated with particles of a carbon dioxide adsorbent and extending circumferentially between the inner shell 146 and the intermediate shell 148, for example as depicted in FIG. 8. The folded ribbon embodiment of FIG. 8 typically would result in a lower pressure drop in the box air or regeneration air passing through the canister scrubber apparatus 140 as compared to the packed bed arrangement of FIG. 7. In another embodiment, a carbon monolith or carbon fiber material is placed within the annular space between the inner shell 146 and the intermediate shell 148. However, it is to be understood that other arrangements of the carbon dioxide adsorbent may be used in carrying out the method disclosed herein. For example, the scrubber apparatus may simply comprise a canister having an outer shell defining core and having a carbon dioxide adsorbent material disposed within the core, such as a bed of granules or pellets loosely packed into the core, or a carbon monolith or carbon fiber material placed within the core.

When the scrubber apparatus 140 is operated in an adsorption mode as depicted in FIG. 4A, the carbon dioxide containing gas, such as the circulating box air, enters the inner core 150 at the first end of the canister, passes through the openings 154 in the inner shell 146 into and thence through the porous mass of regenerative carbon dioxide adsorbent material 142, and thence passes through the openings 156 in the intermediate shell 148 into the outer passage 152 to exit through the annular opening at the second end of the canister. The scrubbed air is then returned to the circulating container box air. When the scrubber apparatus 140 is operated in a regeneration mode as depicted in FIG. 4B, the regeneration air flow passes through the canister in reverse. That is, in the regeneration mode, the regeneration air enters the annular outer passage 152 through the annular opening at the second end of the canister, passes through the openings 156 in the intermediate shell 148 into and thence through the porous mass of regenerative carbon dioxide adsorbent material 142, and thence passes through the openings 154 in the inner shell 146 into the inner core 150 to exit through the central opening in the first end of the canister of the scrubber apparatus 140. The carbon dioxide laden air is then exhausted outside of the cargo box.

Referring now to FIGS. 5A and 5B, the scrubber apparatus 240 depicted therein comprises an outer shell 244 defining an inner core and a plurality of tubes 246 disposed coaxially within the inner core and arrayed in spaced relationship relative to each other and relative to the outer shell 244. The porous mass of regenerative carbon dioxide adsorption material 242 is packed into the inner core in the space provided between the array of the plurality of tubes 246 and the outer shell 244. Each tube of the plurality of tubes 246 provides a flow passage through the porous mass of regenerative carbon dioxide adsorption material 242.

When the scrubber apparatus 240 is operated in an adsorption mode as depicted in FIG. 5A, the carbon dioxide containing gas, such as the circulating box air, enters a first end of the inner core (i.e. the upper end as depicted in FIG. 5A) and passes through the porous mass of regenerative carbon dioxide adsorbent material 242 disposed within the inner core defined by the outer shell 244 and about the tubes 246, and exits the scrubber apparatus 240 through the second end of the inner core (i.e. the lower end as depicted in FIG. 5A). In the adsorption mode, no gas passes through the tubes 246. When the scrubber apparatus 240 is operated in a regeneration mode as depicted in FIG. 5B, the regeneration air enters the second end of the inner core (i.e. the lower end as depicted in FIG. 5B) and passes through the porous mass of regenerative carbon dioxide adsorbent material 242, and exits the scrubber apparatus 240 through the first end of the inner core (i.e. the upper end as depicted in FIG. 5B). Simultaneously, a heated gas is passed through the plurality of tubes 246 so as to heat the porous mass of regenerative carbon dioxide adsorbent material 242 during the regeneration mode to enhance the desorption of carbon dioxide from the adsorbent material 242. The heated gas exits tubes 246 and is directed outside the cargo box. When the scrubber apparatus 240 is used in connection with a transport refrigeration unit, the heated gas may comprise air having traversed the refrigerant heat rejection heat exchanger of the transport refrigeration unit, or outdoor air preheated prior to passing through the tubes 246, for example by passing in heat exchange relationship with a heating gas, such as engine exhaust gases. The heated gas passed through the tubes 246 may also comprise engine exhaust gases from on onboard engine powering the refrigeration unit or from the engine of a truck or a trailer cab associated with the container.

Referring now to FIGS. 6A and 6B, the scrubber apparatus 340 depicted therein comprises an outer shell 344 circumscribing and disposed coaxially about an inner shell 346. The inner shell 346 defines an inner core. The porous mass of regenerative carbon dioxide adsorption material 342 is packed into the inner core. The outer shell 344 is spaced radially outboard of the inner shell 346 to form an annular gap 348 about the inner shell 346.

When the scrubber apparatus 340 is operated in an adsorption mode as depicted in FIG. 6A, the carbon dioxide containing gas, such as the circulating box air, enters a first end of the inner core (i.e. the upper end as depicted in FIG. 6A) and passes through the porous mass of regenerative carbon dioxide adsorbent material 342 disposed within the inner core defined by the inner shell 346 (i.e. the lower end as depicted in FIG. 6A). The scrubbed air is then directed back to the circulating box air. In the adsorption mode, no flow passes through the annular gap 346. When the scrubber apparatus 340 is operated in a regeneration mode as depicted in FIG. 6B, the regeneration air enters the second end of the inner core (i.e. the lower end as depicted in FIG. 6B) and passes through the porous mass of regenerative carbon dioxide adsorbent material 342 packed within the inner shell 346, and exits the scrubber apparatus 340 through the first end of the inner core (i.e. the upper end as depicted in FIG. 6B). Simultaneously, a heated gas is passed through the annular gap 348 between the outer shell 344 and the inner shell 346 so as to heat the porous mass of regenerative carbon dioxide adsorbent material 342 during the regeneration mode to enhance the desorption of carbon dioxide from the adsorbent material 342. The carbon dioxide laden gas is then exhausted outside the cargo box and the heated gas is directed (also outside the box?) When the scrubber apparatus 340 is used in connection with a transport refrigeration unit, the heated gas may comprise air having traversed the refrigerant heat rejection heat exchanger of the transport refrigeration unit, or outdoor air preheated prior to passing through the annular gap 348, for example by passing in heat exchange relationship with a heating flow, such as engine exhaust gases. The heated flow passed through the annular gap 348 may also comprise engine exhaust gases from on onboard engine powering the refrigeration unit or from the engine of a truck or a trailer cab associated with the container.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A regenerative scrubber system for removing carbon dioxide from an atmosphere within a closed environment of a refrigerated container for transport of perishable produce, comprising:

at least one scrubber apparatus housing a porous mass of a carbon dioxide adsorbent material, the scrubber apparatus defining a flow path through the scrubber apparatus traversing the porous mass of a carbon dioxide adsorbent material;

a scrubber system bypass providing a bypass flow path excluding the at least one scrubber apparatus, the scrubber system bypass including a bypass flow control device to control flow between the flow path through the scrubber apparatus and the bypass flow path; and a controller for selectively (i) directing a gas from the atmosphere within the closed environment along said flow path and to a heat exchanger during operation in an adsorption mode, and (ii) selectively directing air from outside the closed environment along said flow path and directing gas from the atmosphere within the closed environment along the bypass flow path to the heat exchanger during operation in a regeneration mode.

2. The regenerative scrubber system as recited in claim 1 wherein the controller is operative for switching operation of said at least one scrubber apparatus between the adsorption mode and the regeneration mode.

3. The regenerative scrubber system as recited in claim 2 wherein the controller is operative for switching operation of said at least one scrubber apparatus between the adsorption mode and the regeneration mode at predetermined time intervals.

4. The regenerative scrubber system as recited in claim 2 wherein the controller is operative for switching operation of the at least one scrubber apparatus between the adsorption mode and the regeneration mode in response to a sensed concentration of carbon dioxide in the atmosphere within the closed environment.

5. The regenerative scrubber system as recited in claim 1 wherein:
said at least one scrubber apparatus comprises a first scrubber apparatus and a second scrubber apparatus operatively disposed in parallel relationship, the first scrubber apparatus housing a first porous mass of a carbon dioxide adsorbent material and the second scrubber apparatus housing a second porous mass of a carbon dioxide adsorbent material; and said controller is configured to operate one of the first and second porous masses of a regenerative carbon dioxide adsorbent material in an adsorption mode and simultaneously operate the other one of the first and second porous masses of a regenerative carbon dioxide adsorbent material in a regeneration mode.

6. The regenerative scrubber system as recited in claim 5 wherein the controller is configured to switch operation of the first scrubber apparatus and the second scrubber apparatus between the adsorption mode and the regeneration mode after a predetermined period of time.

7. The regenerative scrubber system as recited in claim 5 wherein the controller is configured to switch operation of the first scrubber apparatus and the second scrubber apparatus between the adsorption mode and the regeneration mode in response to a sensed concentration of carbon dioxide in the atmosphere within the closed environment.

8. The regenerative scrubber apparatus as recited in claim 1 wherein the scrubber apparatus comprises:
an inner shell, an intermediate shell and an outer shell disposed in radially spaced relationship about a central axis;
said inner shell defining a hollow core;
said inner shell and said intermediate shell defining an annular space therebetween, the porous mass of regenerative carbon dioxide adsorbent disposed in the annular space between said inner shell and said intermediate shell;
said outer shell and said intermediate shell defining an annular outer flow passage therebetween;
a plurality of flow openings formed in said intermediate shell; and
a plurality of flow openings formed in said inner shell.

9. The regenerative scrubber apparatus as recited in claim 1 wherein the scrubber apparatus comprises:
an outer shell defining a hollow core; and
a plurality of tubes disposed coaxially and arrayed in spaced parallel arrangement within the core defined by the outer shell, the porous mass of regenerative carbon dioxide adsorbent disposed in the core amongst the array of tubes and between the array of tubes and the outer shell.

10. The regenerative scrubber apparatus as recited in claim 1 wherein the scrubber apparatus comprises:
an outer shell and an inner shell, the outer shell circumscribing and disposed in radially spaced relationship to and coaxially about the inner shell, thereby defining an annular outer flow passage about the inner shell, the inner shell defining a hollow core in which a porous mass of regenerative carbon dioxide adsorbent material is disposed.

* * * * *